United States Patent [19]
Takemasa

[11] Patent Number: 5,860,710
[45] Date of Patent: Jan. 19, 1999

[54] CASCADE LOCKING DETECTION METHOD AND ANTILOCK BRAKE CONTROL METHOD

[75] Inventor: Noriyuki Takemasa, Hamakita, Japan

[73] Assignee: Nisshinbo Industries Inc., Tokyo, Japan

[21] Appl. No.: 886,115

[22] Filed: Jun. 30, 1997

[30] Foreign Application Priority Data

Jul. 19, 1996 [JP] Japan ................................ 8-209190

[51] Int. Cl.⁶ .................................................. B60T 8/62
[52] U.S. Cl. ........................................ 303/190; 303/186
[58] Field of Search .................................... 303/166, 170, 303/171, 173, 186, 187, 190, DIG. 6; 180/244; 701/74

[56] References Cited

U.S. PATENT DOCUMENTS

| 5,012,884 | 5/1991 | Sato | 303/190 |
| 5,100,209 | 3/1992 | Arikawa | 303/170 |
| 5,282,138 | 1/1994 | Sauo | 303/170 |
| 5,470,135 | 11/1995 | Shitani et al. | 303/122.03 |
| 5,599,075 | 2/1997 | Hara et al. | 303/190 |
| 5,615,935 | 4/1997 | Beyer et al. | 303/190 |
| 5,634,699 | 6/1997 | Ichikawa et al. | 303/190 |
| 5,651,593 | 7/1997 | Shitani et al. | 303/190 |

Primary Examiner—Robert J. Oberleitner
Assistant Examiner—Chris Schwartz
Attorney, Agent, or Firm—Nikaido, Marmelstein, Murray & Oram LLP

[57] ABSTRACT

A method is provided to detect, without the use of G-sensors, possible cascade locking in a four-wheel drive vehicle equipped with wheel speed sensors. The method measures the speed of each wheel with the respective wheel-speed sensor, and derives an estimated vehicle speed and a front and rear speed difference between the front and rear wheel speeds from the wheel speeds. When the deceleration of the estimated vehicle speed is smaller than a first threshold value and the absolute value of the front and rear speed difference is larger than a second threshold value, and if the change in the speed of the front wheels is smaller than the change in the front and rear speed difference at a time when the absolute value of the difference diminishes, then cascade locking of the four wheels is deemed to be starting.

4 Claims, 9 Drawing Sheets

CASCADE LOCKING DETECTION METHOD AND ANTILOCK BRAKE CONTROL METHOD

BACKGROUND OF THE INVENTION

This invention concerns a method for detecting the start of cascade locking in a four-wheel drive vehicle and the associated antilock brake control system (ABS).

In the conventional method of detecting the start of cascade locking, namely the tendency of all four wheels of a four-wheel drive vehicle to lock, a G-sensor detects vehicle deceleration. Corresponding signals are sent to an electric central processing unit (CPU), which computes vehicle speed from the deceleration figures. The vehicle speed so derived and the wheel speeds are compared so as to detect whether all four wheels are locked, and if so, an antilock operation is executed. This conventional method not only requires a G-sensor but also a complementary structure that includes a function to check for G-sensor malfunction.

OBJECTS AND SUMMARY OF THE INVENTION

It is an object of the present invention to provide a system to detect cascade locking in a four-wheel drive vehicle without the use of G-sensors.

It is another object of the present invention to provide a method to execute ABS on a four-wheel drive vehicle without the use of G-sensors.

This invention provides the following advantages: cascade locking in a four-wheel drive vehicle is detected without the use of G-sensors; and ABS is executed on a four-wheel drive vehicle without the use of G-sensors.

The present invention is a method to detect, without the use of G-sensors, possible cascade locking in a four-wheel drive vehicle equipped with wheel speed sensors. The method measures the speed of each wheel with the respective wheel-speed sensor, and derives an estimated vehicle speed and a front and rear speed difference between the front and rear wheel speeds from the wheel speeds. When the deceleration of the estimated vehicle speed is smaller than a first threshold value and the absolute value of the front and rear speed difference is larger than a second threshold value, then cascade locking of the four wheels is deemed to be starting. Additionally or alternatively, if the change in the speed of the front wheels is smaller than the change in the front and rear speed difference at a time when the absolute value of the difference diminishes, then cascade locking of the four wheels is deemed to be starting.

The possible cascade locking can be controlled by initiating ABS after cascade locking of the four wheels is deemed to be starting.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

The conditions covering execution of this invention are explained below, with reference to the attached diagrams.

Figure 1:
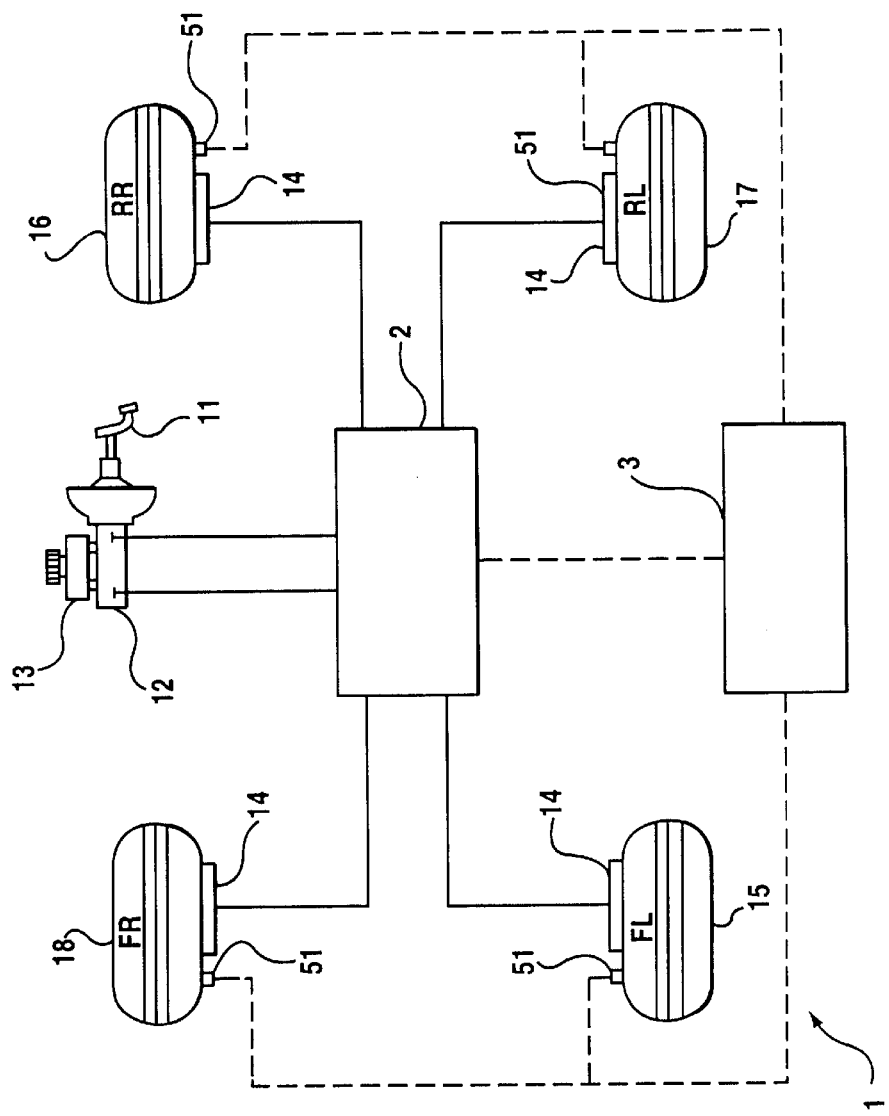
FIG. 1 shows depicts an ABS device.
Figure 2:
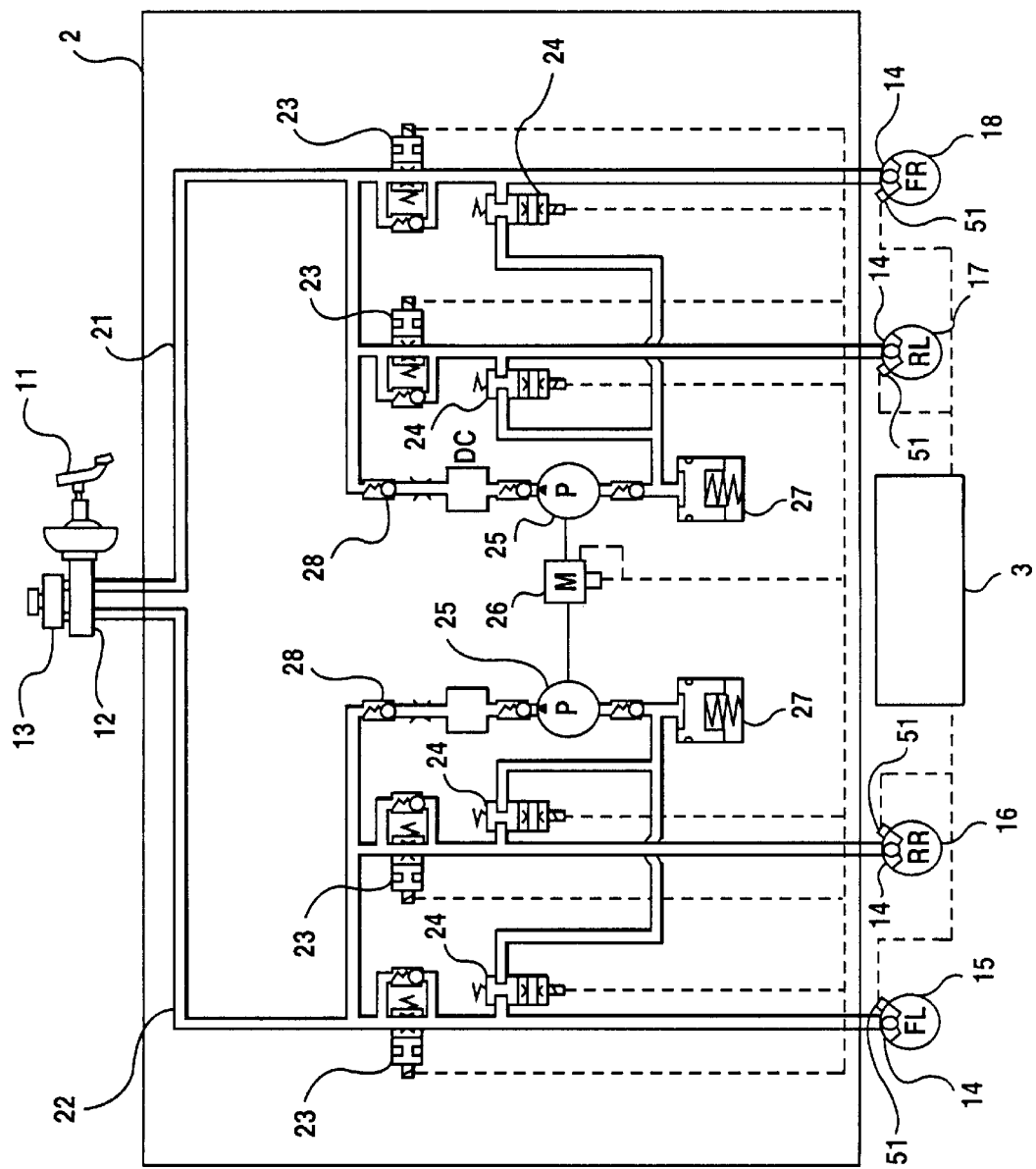
FIG. 2 illustrates the brake line configuration for ABS.

A general overview of an ABS control device 1 is shown in FIGS. 1 and 2. Brake pressure is transferred from the master cylinder 12 to the wheel brakes 14 of each wheel via the ABS hydraulic pressure unit 2. Specifically, when a driver presses the brake pedal 11, brake pressure generated at the master cylinder 12 is supplied via the ABS hydraulic pressure unit 2 to the respective wheel brakes 14 of each wheel 15–18 to slow the vehicle. Should, for example, the brake pedal be pressed hard enough to cause the wheels to slip, the electronic control device 3 executes an antilock control operation on each wheel 15–18, based on signals from the respective wheel-speed sensors 51 via the ABS hydraulic pressure unit 2.

The electronic control unit 3 can be customized, or configured with generally used computer components such as input device, processor, output device, etc.

FIG. 2 illustrates a brake system having two independent brake lines, first brake line 21 and second brake line 22, joining through the master cylinder 12. A main reservoir 13 stores the brake fluid that is supplied to the master cylinder 12. The first brake line 21 is connected to the wheel brake 14 of the right front wheel 18 and left rear wheel 17 via inlet valves 23 and via outlet valves 24 to the auxiliary reservoir 27. Similarly, the second brake line 22 is connected to the wheel brake 14 of the right rear wheel 16 and left front wheel 15 via inlet valves 23 and via outlet valves 24 to the auxiliary reservoir 27.

Figure 3:
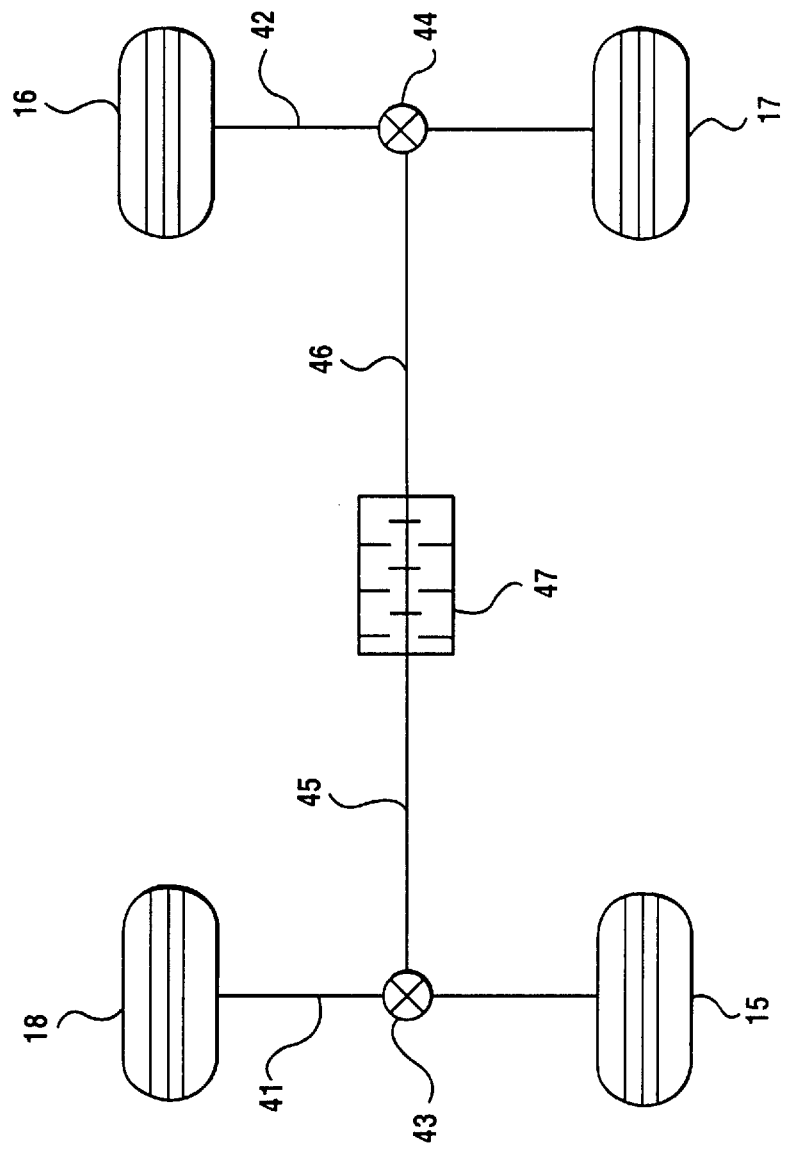
FIG. 3 shows transfer of power in a four-wheel drive vehicle.

Motive power can be supplied to the left front wheel 15 and the right front wheel 18 of a four-wheel drive vehicle by a variety of methods. For example, as shown in FIG. 3, the left front wheel 15 and the right front wheel 18 are connected to the front axle 41 via the front differential 43, and the left rear wheel 17 and right rear wheel 16 are connected to the rear axle 42 via the rear differential 44. The front axle 41 and rear axle 42 are connected by means of the front propeller shaft 45, viscous coupling 47 or a similar type of liquid shaft-coupling mechanism, and the rear propeller shaft 46. The viscous coupling 47, or similar type of liquid shaft-coupling mechanism, has the dual function of absorbing the difference in revolution of the front and rear propeller shafts as well as of transferring motive power.

An explanation of brake control operations follows.

During normal braking, a driver steps on the brake pedal 11 to initiate the release of brake fluid from the main reservoir 13 which generates brake pressure at the master cylinder 12. The pressure so generated is applied to the inlet valves 23 of the main brake lines and the wheel brakes 14 to slow the vehicle.

Figure 4:
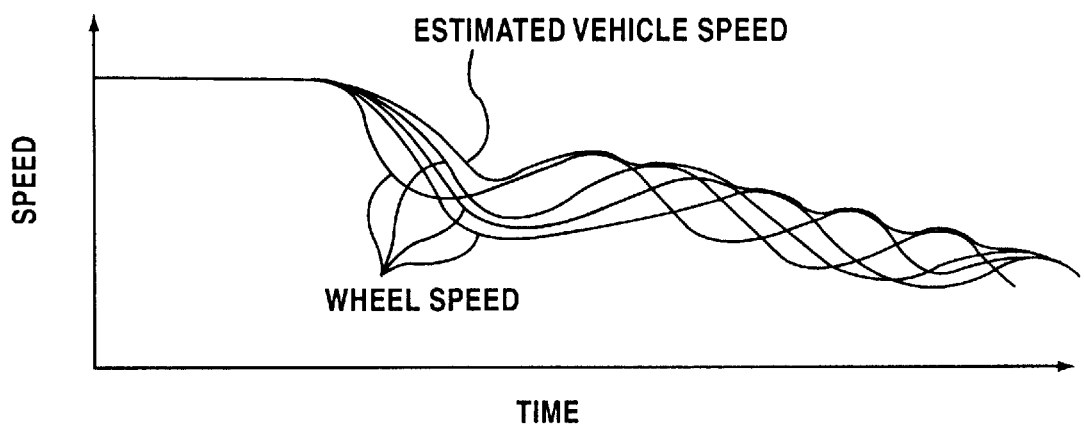
FIG. 4 is a graph showing estimates of vehicle speed according to the speed of the four wheels.

The wheel speed sensor 51 of each wheel 15–18 measures the rotational frequency of each wheel and the data is used by the electronic control unit 3 to compute wheel speed. Also, an estimated vehicle speed is derived from the wheel speed. FIG. 4 shows such an example. Should a wheel slip such that the difference between the estimated vehicle speed and a given wheel speed exceed a threshold value, then ABS is executed on the wheel.

During execution of ABS, brake pressure is discharged from the wheel brake 14 via outlet valves 24 to the auxiliary reservoirs 27 by operating outlet valve 24, pump 25, and inlet valves 23. Conversely, brake pressure is also supplied to each wheel brake 14 by means of pumps 25 and motor 26, dumping chamber DC, check valves 28, and inlet valves 23. The combined action thereof controls the slip of each wheel.

Figure 5:
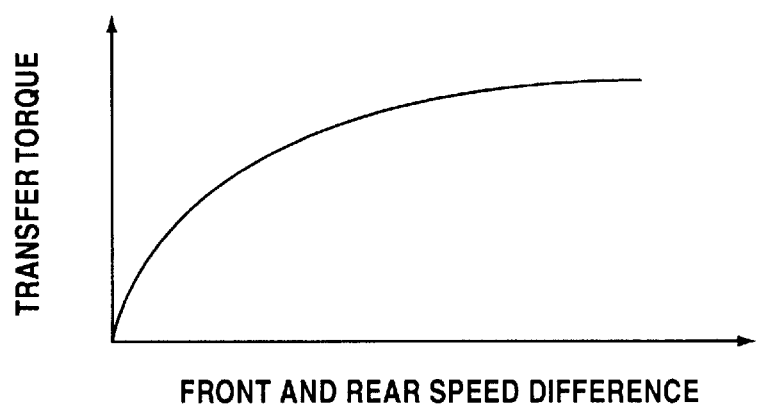
FIG. 5 is a graph showing a plot of transfer torque against the difference between front and rear wheel speed.

In a four-wheel drive vehicle, the front axle 41 for the front wheels and the rear axle 42 for the rear wheels are connected, for example, by a viscous coupling 47. The transfer torque of the viscous coupling 47 is a function of the difference in speed between the front and rear wheels hereafter called the "front and rear speed difference", as shown in FIG. 5. The larger this front and rear speed difference, the greater is the transfer torque.

Figure 6:
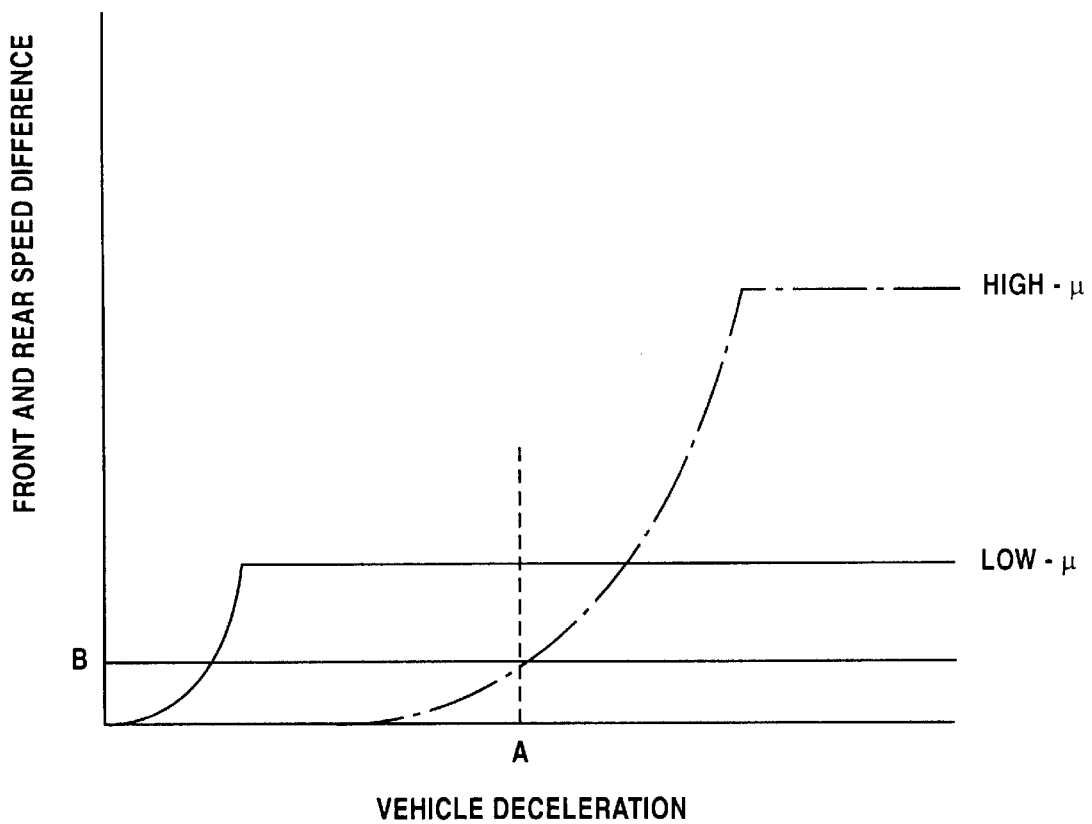
FIG. 6 is a graph which illustrates the relationship between the deceleration of a vehicle and the difference between the front and rear wheel speeds, depending on road surface conditions.

FIG. 6 illustrates the relationship between vehicle deceleration and the front and rear speed difference for a road surface with a low coefficient of friction $\mu$ and one with a high coefficient of friction $\mu$. The horizontal axis plots the rate of reduction of the vehicle speed, that is, vehicle deceleration, and is indicative of the rate of reduction of the rotational frequency of the wheels.

When the brakes are applied while the vehicle is in motion, a front and rear speed difference is generated as a function of the gripping state of the front and rear wheels to the road surface. The front and rear speed difference is calculated, for example, to be equal to the sum of the speeds of the left and right front wheels 15, 18 minus the sum of the speeds of the left and right rear wheels 17, 16.

Figure 7:
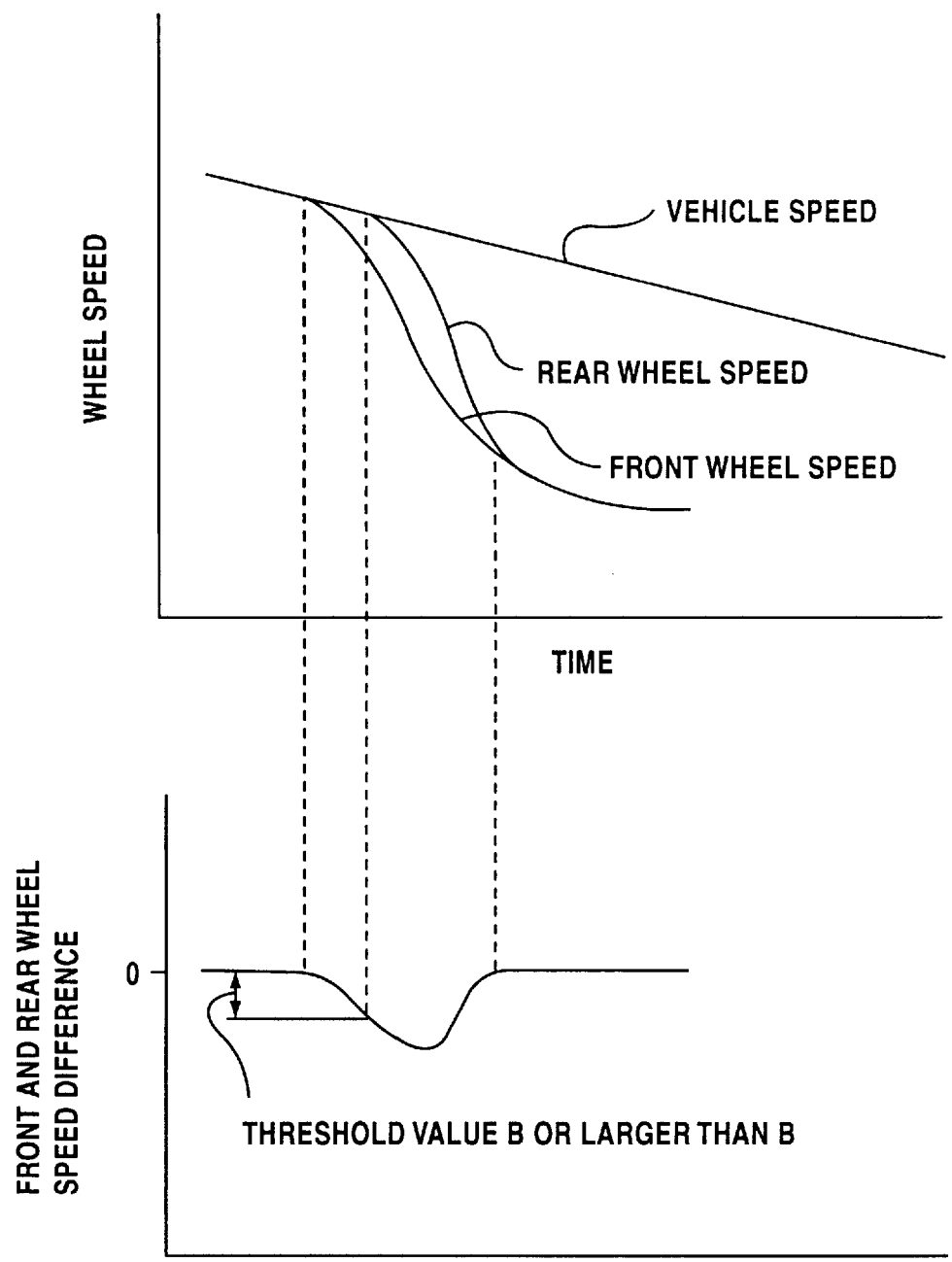
FIG. 7 is a graph which illustrates the speed of the front and rear wheels on a road surface with a low coefficient of friction $\mu$.
Figure 8:
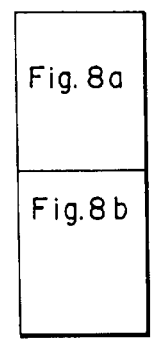
FIG. 8 is a flowchart showing the detection process for cascade locking.
Figure 8A:
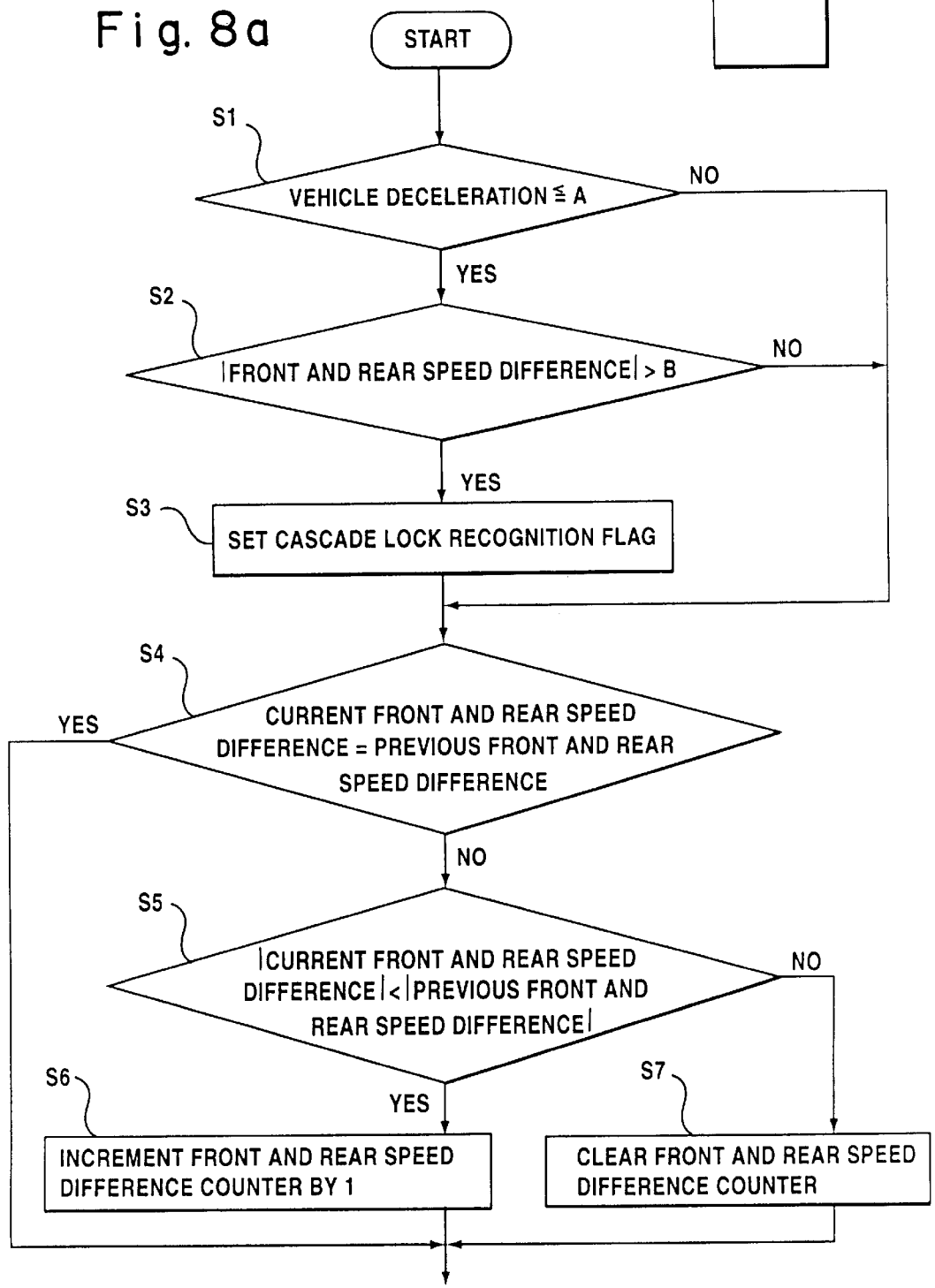
Figure 8B:
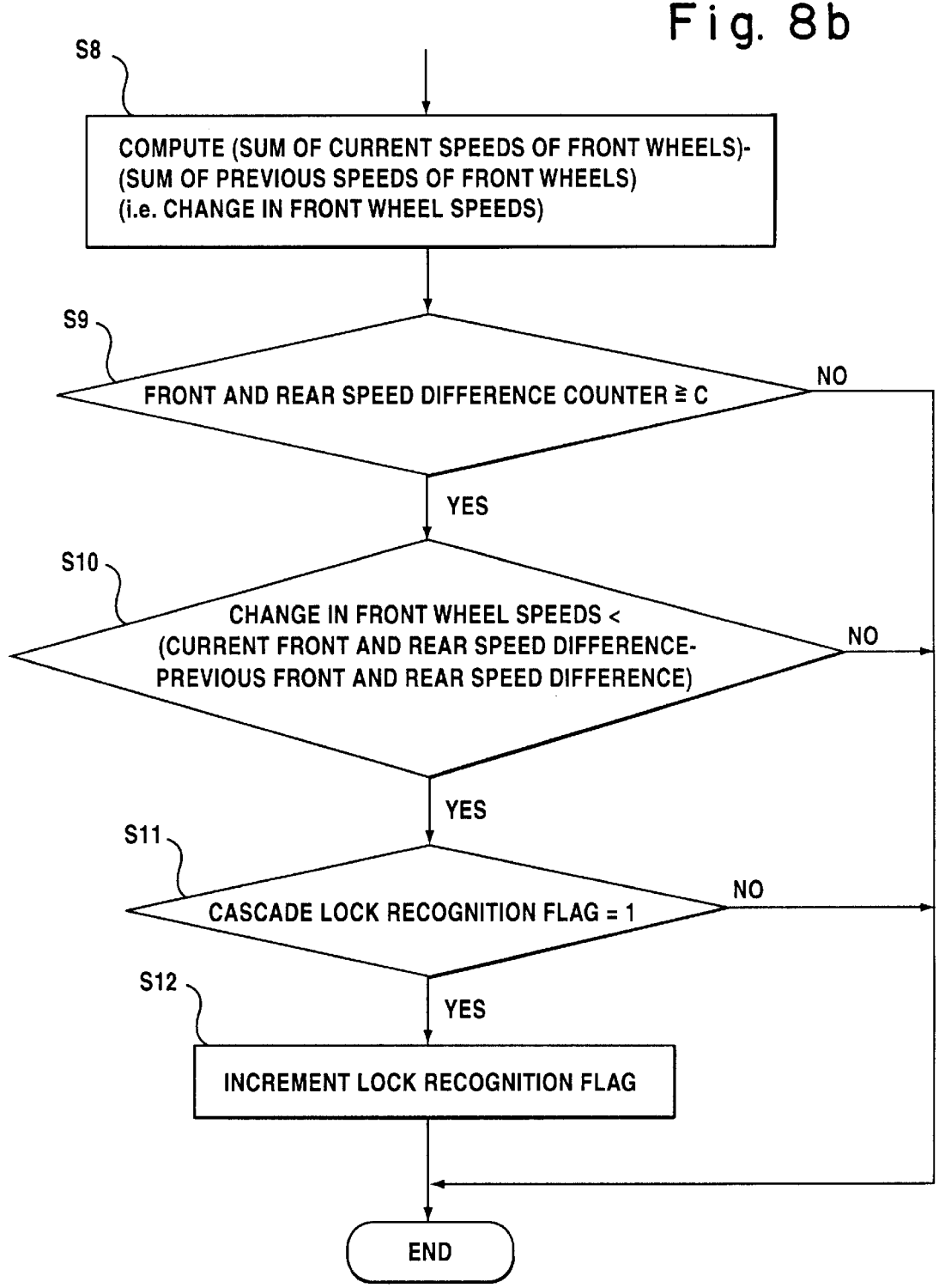

When this front and rear speed difference causes the torque transferred to the rear wheels to become larger than the reaction force of the road surface—that is, the gripping force—acting on the rear wheels, the rear wheels become easier to slip, with the slip of the front wheels as shown in FIG. 7. For instance on a road surface with a low coefficient of friction such as a frozen road surface, the front wheels lose the gripping force and slip before vehicle deceleration becomes larger. Accordingly, the front and rear speed difference becomes larger than threshold value B before the vehicle deceleration becomes larger than threshold value A. Then, the rear wheels slip because of the transmitted torque caused by the front and rear wheel speed difference. At this time, since the rear wheels will slip so as to absorb the difference in speed between the front and rear wheels, the front and rear speed difference will approximate zero with time.

On a road surface with a high friction coefficient $\mu$, such as a dry asphalt road, the gripping force of a vehicle on this road surface is much greater. Under these circumstances, in order for the front wheels to begin to slip, or for the front and rear wheel speed difference to become larger than the threshold value B, the vehicle deceleration will approximate or exceed the threshold value A. In addition, even if the torque transferred occurs due to the front and rear speed difference, when the rear wheels begin to slip, the front and rear speed difference will increase since the rear wheels do not begin to slip easily as long as the torque is far larger than the torque created when the front and rear speed difference is the threshold value B.

The following is an explanation of how the start of cascade locking is detected.

1. Setting the cascade locking monitoring flag

As shown in Flowchart 8, one method to detect cascade locking begins with a calculation of the wheel speed of each wheel derived from the wheel-speed sensor. Vehicle deceleration is estimated from variations in the wheel speeds. The estimated vehicle deceleration is then compared with a threshold value A positive value in S1. If this figure is smaller than the value A, meaning that the vehicle has not decelerated to a certain value, and the absolute value of the front and rear speed difference is larger than a threshold value B in S2, then there is high probability that the vehicle is on a road surface with a low coefficient of friction $\mu$. The flag to allow monitoring of a possible cascade lock is set in S3, then processing moves to the next step.

2. Eliminating the effect of vehicle vibration and other factors

Next, a check is made as to whether the front and rear speed difference is approaching zero so as to eliminate the effect of vibration and other operating characteristics of the vehicle. For this, the current value of the front and rear speed difference is compared with the previous value of the front and rear speed difference, and if the two values are equal in S4, processing skips to S8. If the two values are not equal, the absolute values of the current and previous front and rear speed differences are compared in S5. If the current value is smaller than the previous value, then the front and rear speed difference counter is incremented in S6. If the current value is greater than the previous value, then the counter is cleared in S7. The incrementing of the counter is checked in this manner to determine if the front and rear speed difference is approaching zero over a number of comparisons. These procedures eliminate the possibility of a misdiagnosis arising from only one judgment.

Figure 9:
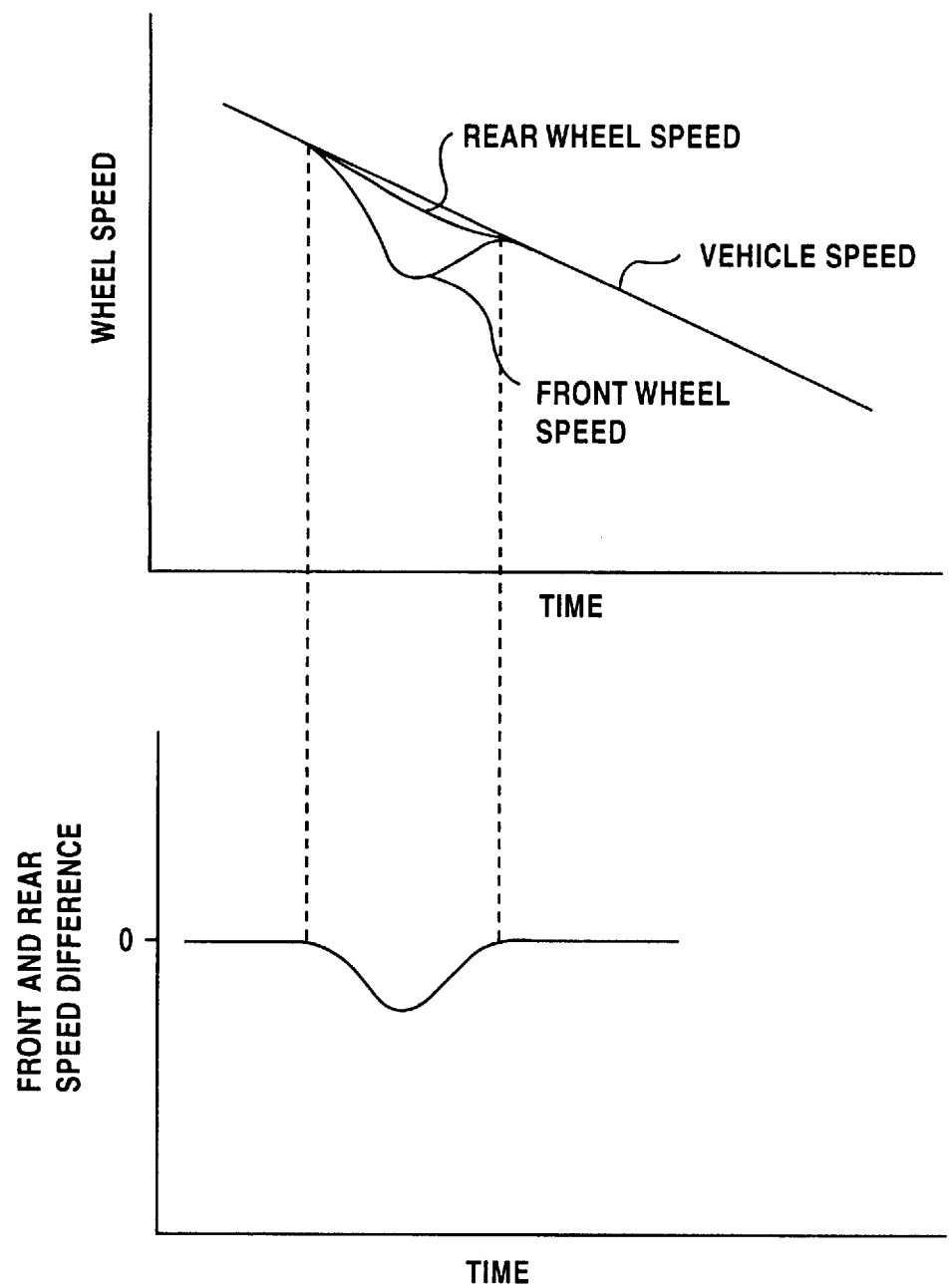
FIG. 9 is a graph which illustrates the speed of the front and rear wheels on a road surface with a high coefficient of friction $\mu$.

3. Eliminating the effect of a front-wheel skid and processing of front wheel vibration data Should a driver suddenly apply the brakes on a road surface with a high coefficient of friction $\mu$ and thereby cause the front wheels to skid, then as shown in FIG. 9, the front and rear speed difference will also approach zero from a negative value as a reduction in the brake pressure causes the wheel speeds to return to that of the vehicle speed. The effect of this condition must be eliminated. However, cascade locking could also occur as a result of the front wheels vibrating on a road surface with a low friction coefficient $\mu$, and the two phenomena must be differentiated. For this, the change in the front wheel speed is compared with the change in the front and rear speed difference. If an amount of change of the front wheel speed until returning to the actual vehicle speed is smaller than an amount of change in the front and rear speed difference as it approaches zero, the condition indicates that the front and rear speed difference is approaching zero not because of the front wheels returning to the vehicle speed but because of the deceleration of the rear wheels caused by the structural connection via the viscous coupling with the front wheels of a lower wheel speed. Consequently, the system determines that cascade locking has started.

Accordingly, first, the change in the speed of the front wheels is examined. For this, the sum of the previous value of the speeds of the two front wheels is subtracted from the current value of the speeds of the two front wheels in S8.

Next, the value of the front and rear speed difference counter is checked against that of the threshold value C in S9. If the counter value is greater than C, then the change in the speed of the front wheels is compared with the difference between the current value of the front and rear speed difference and the previous value of the front and rear speed difference in S10. If the change in the front and rear speed difference is greater, a check is made as to whether the cascade lock monitoring flag is set as described above. If the flag is set, then it is deemed that a cascade lock is possible in S11, and the cascade lock recognition counter is incremented in S12. If S9, S10, and S11 are negative, then the system detects no state of cascade locking, and processing ends.

4. ABS

If cascade locking is detected and the four wheels lock, ABS will be executed on each wheel.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A method to detect cascade locking of the wheels of a four-wheel drive vehicle equipped with wheel-speed sensors comprising:

measuring the speed of each wheel with the respective wheel-speed sensor, deriving an estimated vehicle speed from said wheel speeds, (which)

calculating the difference between the front and rear wheel speeds from said wheel speeds, determining deceleration of said estimated vehicle speed, determining when the deceleration of said estimated vehicle speed is smaller than a first specified threshold value, determining when the absolute value of said front and rear speed difference is larger than a second specified threshold value, determining change of speed of the front wheels, determining change of difference between the front and rear wheel speeds, comparing the change in the speed of the front wheels with the change in said front and rear speed difference, and deciding that cascade locking of the four wheels is starting if said deceleration of said estimated vehicle speed is smaller than said first specified threshold value, the absolute value of said front and rear wheel speed difference is larger than said second specified threshold value, and the change in the speed of the front wheels is smaller than the change in said front and rear speed difference at a time when the absolute value of said front and rear wheel speed difference diminishes.

2. A method to detect cascade locking of the wheels of a four-wheel drive vehicle equipped with wheel-speed sensors comprising:

measuring the speed of each wheel with the respective wheel-speed sensor, deriving an estimated vehicle speed, calculating the difference between the front and rear wheel speeds from said wheel speeds, determining the deceleration of said estimated vehicle speed, determining when the deceleration of said estimated vehicle speed is smaller than a first specified threshold value, determining when the absolute value of said front and rear speed difference is larger than a second specified threshold value, determining a change of the speed of the front wheels, determining change of difference between the front and rear wheel speeds, comparing the change in the speed of the front wheels with the change in said front and rear speed difference, setting a flag to monitor said front and rear speed difference for multiple comparisons if the deceleration is less than the first specified threshold value, and deciding that cascade locking of the four wheels is starting if the absolute value of said front and rear speed difference diminishes over that period, and if the flag is set when the change in the speed of the front wheels is smaller than the change in the front and rear speed difference.

3. A method to control cascade locking of the wheels of a four-wheel drive vehicle equipped with wheel-speed sensors comprising:

measuring the speed of each wheel with the respective wheel-speed sensor, deriving an estimated vehicle speed from said wheel speeds, calculating the difference between the front and rear wheel speeds from said wheel speeds, determining the deceleration of said estimated vehicle speed, determining when the deceleration of said estimated vehicle speed is smaller than a first specified threshold value, determining when the absolute value of said front and rear speed difference is larger than a second specified threshold value, determining a change of the speed of the front wheels, determining a change of the difference between the front and rear wheel speeds, comparing the change in the speed of the front wheels with the change in said front and rear speed difference, and deciding that cascade locking of the four wheels is starting if said deceleration of said estimated vehicle speed is smaller than said first specified threshold value, the absolute value of said front and rear wheel speed difference is larger than said second specified threshold value, and the change in the speed of the front wheels is smaller than the change in said front and rear speed difference at a time when the absolute value of said difference diminishes, wherein after deciding that cascade locking of the four wheels is starting, ABS is executed.

4. A method to detect cascade locking of the wheels of a four-wheel drive vehicle equipped with wheel-speed sensors comprising:

measuring the speed of each wheel with the respective wheel-speed sensor, deriving an estimated vehicle speed, calculating the difference between the front and rear wheel speeds from said wheel speeds, determining the deceleration of said estimated vehicle speed, determining when the deceleration of said estimated vehicle speed is smaller than a first specified threshold value, determining when the absolute value of said front and rear speed difference is larger than a second specified threshold value, determining a change of the speed of the speed of front wheels, determining a change of the difference between the front and rear wheel speeds, comparing the change in the speed of the front wheels with the change in said front and rear speed difference, setting a flag to monitor said front and rear speed difference for multiple comparisons if the deceleration is less than the first specified threshold value, and deciding that cascade locking of the four wheels is starting if the absolute value of said front and rear speed difference diminishes over that period, and if the flag is set when the change in the speed of the front wheels is smaller than the change in the front and rear speed difference, wherein after deciding that cascade locking of the four wheels is starting, ABS is executed.

* * * * *